Jan. 6, 1925.　　　　　　　　　　　　　　　　　　　1,522,338
H. F. SMITH
VALVE
Filed July 31, 1920　　　　　2 Sheets-Sheet 1

Witnesses
Chas. G. Graef.

Inventor
Harry F. Smith
By
Attorney

Jan. 6, 1925.  1,522,338

H. F. SMITH

VALVE

Filed July 31, 1920   2 Sheets-Sheet 2

Patented Jan. 6, 1925.

1,522,338

UNITED STATES PATENT OFFICE.

HARRY F. SMITH, OF MORAINE, OHIO, ASSIGNOR, BY MESNE ASSIGNMENTS, TO THE GAS RESEARCH COMPANY, OF DAYTON, OHIO, A CORPORATION OF OHIO.

VALVE.

Application filed July 31, 1920. Serial No. 400,391.

*To all whom it may concern:*

Be it known that I, HARRY F. SMITH, a citizen of the United States, residing at Moraine, county of Montgomery, and State of Ohio, have invented certain new and useful Improvements in Valves, of which the following is a full, clear, and exact description.

This invention relates to valves and more particularly to an improved form of angle valve.

One of the principal objects of the invention is to provide an improved form of angle valve fitting, either end of which may be arranged to serve as a valve seat, which is adapted to receive a valve disc and has cooperating valve actuating means, which means is of such character that it will function satisfactorily to operate the valve disc when such disc is associated with either end of the fitting.

Another object of the invention is to provide an angle valve comprising a pivotally mounted valve disc which is so arranged with relation to its seat that during initial opening movement the valve disc moves directly away from said seat, and upon further movement is swung into such position as to minimize its obstruction to flow through the valve fitting.

Other objects and advantages of the invention will be apparent from the description set out below, when taken in connection with the accompanying drawing.

In the drawing, in which like characters of reference designate like parts throughout the several views thereof:

Figure 1:
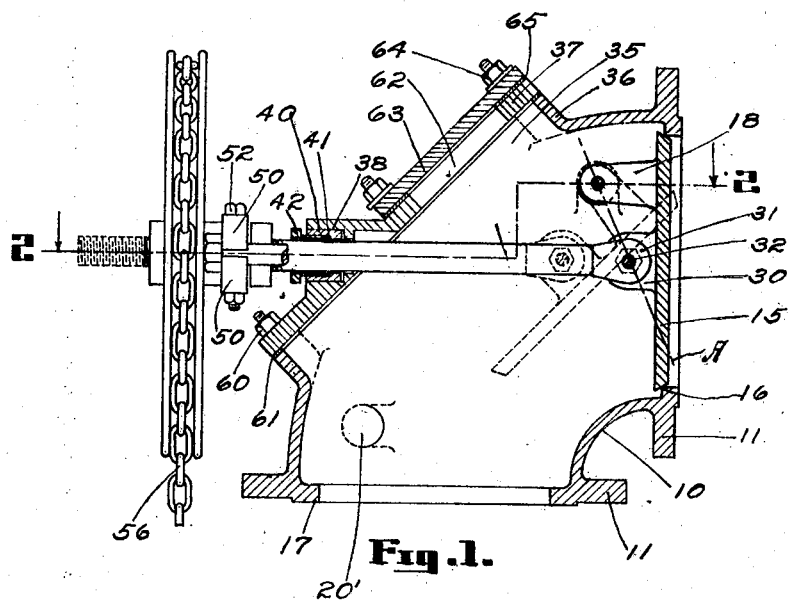
Fig. 1 is a sectional view through a valve constructed in accordance with the invention, the section being along the line 1—1 of Fig. 2.
Figure 2:
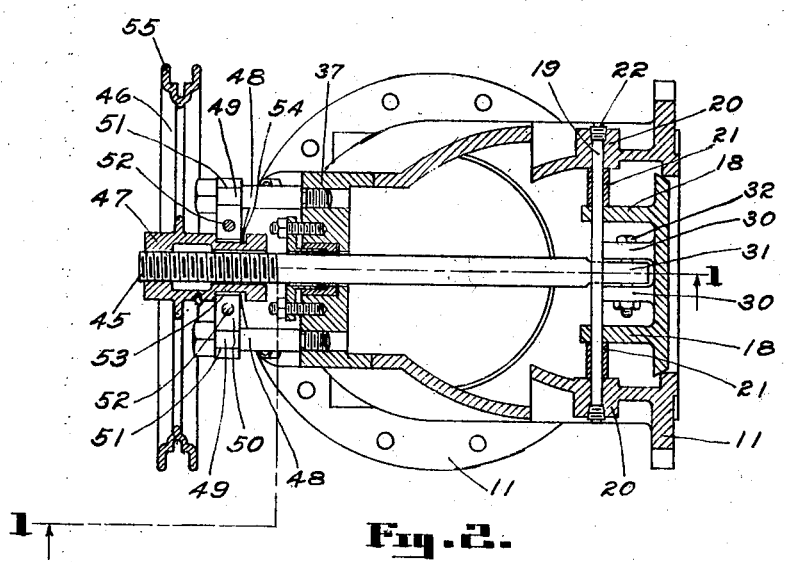
Fig. 2 is a sectional view through said valve, the section being along the line 2—2 of Fig. 1.
Figure 3:
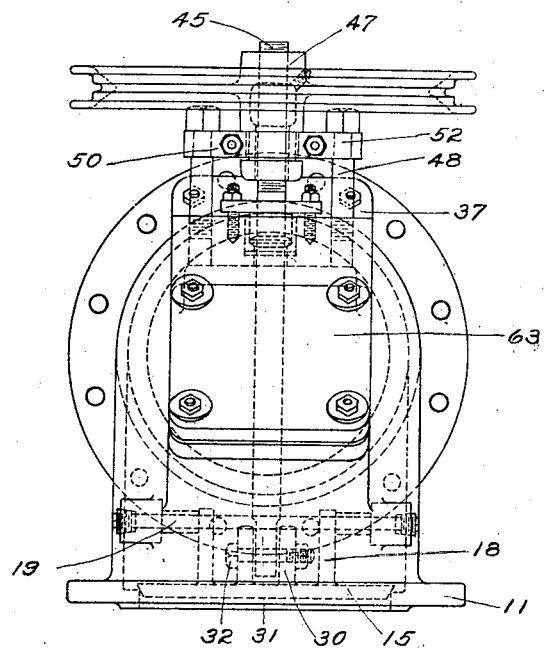
Fig. 3 is a plan view of the valve.

While this invention is susceptible of general application there is illustrated in the drawing a type of valve primarily designed for use in connection with large size pipes, such as gas mains. These mains, for example those used in delivering gas from a gas producer or similar apparatus, are frequently as much as twenty inches in diameter. Heretofore, it has been the practice to use straight-away valves in mains of this type, rather than angle valves, such angles or elbows as were used being merely fittings. In my copending application, Serial No. 175,199, filed June 16, 1917, Letter Patent 1,381,511, June 14, 1921, is shown such a type of straight-away valve. The present invention permits of combining the valve and angle or elbow fitting and thus, by mounting the valve member within said angle or elbow fitting, considerably decreasing the cost of installation.

In the drawing, the numeral 10 designates an angle or elbow fitting, which also serves as a valve housing. The fitting illustrated is of the ninety degree angle type, a flange 11 being provided at each end whereby they may be attached to corresponding flanges upon the pipes to which it is to be joined.

Fittings, especially of the larger sizes, are usually cast, of iron, steel or similar material. When a cast fitting of this type, adapted to serve as a housing for a valve member, is machined to form a valve seat therein, it is oftentimes found that the casting, within that part which is to constitute the seat, is defective, and consequently the whole fitting has to be scrapped. In order to decrease the percentage of rejections, and thus lower the cost of production of valve fittings of the type shown herein, each fitting is cast so that either end thereof may be machined to form the valve seat. In Fig. 1, for example, the valve disc 15 is shown seated against a properly machined valve seat 16, this seat being so formed as to present a very narrow seating face, to minimize the possibility of the valve disc and cooperating face of the valve seat binding or sticking together. In actual gas producer practice the face of the valve seat has a width of about $\frac{1}{16}$ to $\frac{1}{8}$ of an inch. The other end 17 of the fitting is also formed, as clearly shown in the drawing, so that it may be machined to form a valve seat just like the seat 16. In preparing a valve fitting for use either end of the fitting is, in the first instance, machined to form a seat. If such seat proves defective the other end is then machined. If this second seat also proves defective, the fitting is scrapped. The number of rejected fittings, however, is thus very greatly decreased. Of course, if desired, both ends may be machined to form seats, either end being used when the valve is installed.

In the type of valve disclosed the valve disc 15 has the face, which cooperates with the valve seat, arcuate in cross section, so that it will fit tightly against its seat, even though slightly displaced during closing movement. This valve disc is pivotally attached to the valve fitting, by means of a plurality of upstanding projections 18, provided on the back of the valve disc, through which, when in assembled position, the somewhat flexible rod 19 passes, the opposite ends of said rod being within passages in the enlargements 20, carried by the valve fitting, the arrangement being such that the valve is pivoted at one side thereof. Spacing members 21 are carried by the rod 19, these members being positioned, when the valve is assembled, between the wall of the valve fitting and the upstanding projections 18, to prevent undue play of the valve disc lengthwise of the rod 19. The outer end of each passage within the enlargements 20 is threaded to receive a threaded plug 22, which plugs, when closing the outer ends of these passages, retain the rod 19 in place. Because of the rod 19 being formed of somewhat flexible material deflection thereof can take place, to assist in securing proper seating of the valve disc upon its cooperating face.

Not only is the fitting 10 so cast that the end 17 is adapted, upon machining, to form a valve seat, but it is also so constructed that enlargements 20' are provided adjacent that end of the fitting which, upon proper preparation, are adapted to receive the rod 19 to carry the valve disc in mounted position. This construction permits of using either end of the fitting 10 to house the valve disc 15.

Mounted upon the back of the valve disc are two upstanding lugs 30 adapted to receive the end of an operating stem 31 therebetween, the lugs and the end of the operating stem being pivotally attached to each other by means of the pivot pin 32. Movement of the valve stem tends to swing the valve disc about the pivot bar 19 to move the valve disc either toward or from its seat. And the arrangement is such that upon opening movement the face of the valve disc is first moved directly away from its seat; the valve disc, upon continued opening movement, being swung into a position which minimizes its obstruction to flow through the valve fitting. In the valve shown, that is in a ninety degree angle valve, the valve disc when in fully open position will be arranged at an angle of substantially forty-five degrees with its seat. In other words, the angular opening of this particular valve is substantially forty-five degrees. In valve fittings having a different curvature, for instance a 120 degree angle, the angular opening will of course be different in each case. In order to secure this movement of the valve disc directly away from its seat during initial opening thereof, and to secure final positioning of the valve disc to minimize its obstruction to flow, a definite relationship between the valve disc, its seat, its pivot bar 19 and its pivot pin 32 is established. The pivot bar 19 is arranged to one side of a diameter of the valve disc, and parallel to that diameter and to the pivot pin 32. That is, the pivot pin 32 is so arranged that its longitudinal axis lies within a plane, which if passed through the valve disc, and perpendicular thereto, would pass through a diameter of that valve disc, this diameter in turn being parallel to the longitudinal axis of the pivot bar 19. The positioning of the pivot bar 19, is dependent upon the positioning of the pivot pin 32. The position of the longitudinal axis of the pivot pin 32 having been determined, a line is drawn therethrough, which line makes an angle with a plane parallel to the plane of the valve seat, which is, for purposes of description, called the plane of the valve seat, equal to half the angular opening of the valve. In the ninety degree angle valve shown the angular opening of the valve is forty-five degrees. This line, in such a valve, therefore, makes an angle of twenty-two and a half degrees with said plane, this line being indicated on the drawing by means of a dotted line designated by the letter A. A point is then located upon this line which is equidistant from the point of intersection of the line with the longitudinal axis of the pivot pin 32 and from the face of the valve disc, where it contacts with the valve seat, and this point is located within the longitudinal axis of the pivot bar 19.

The fitting 10 is constructed with an opening 35 intermediate the flanges 11, such opening being within the outer curvature of the fitting and having an upstanding flange 36 therearound. Cooperating with this upstanding flange is a cover plate 37. The outer face of the flange 36 lies within a plane which makes an equal angle with the valve seat at each end of the fitting. In the type of valve shown this plane makes an angle of forty-five degrees with the seat at each end of the fitting. The cover plate 37 has a passage 38 therethrough adapted to receive the operating stem 31. This passage is so arranged that the operating stem when passing therethrough has its longitudinal axis perpendicular to the face of the valve, or to the plane of the valve seat. Because of the arrangement of the cover plate 37, relative to the valve seat at each end of the fitting, and the arrangement of the passage 38, relative to the valve when seated upon the seat at either end of the fitting, this cover plate will receive the valve stem not only when in the position shown in the drawing, but also when the valve is positioned adjacent the seat at the other end. That is, by moving the cover plate 180 degrees from the position shown in the drawing it will have the same arrangement, relative to the valve disc, when that valve disc is positioned upon the seat at the other end, 17, of the fitting.

Located within the passage 38, and surrounding the valve stem to prevent leakage through said passage is a packing member comprising a stuffing box 40 adapted to receive any desired type of packing 41, and a gland 42 for compressing that packing as may be necessary. The passage 38, and the opening through the stuffing box are made somewhat greater than the diameter of the stem 31. This construction permits of limited movement of the valve stem during opening movement of the valve disc, and in case the valve disc fails to set squarely on its seat. In other words, this construction is, in effect a flexible joint adapted to permit limited lateral movement of the stem, or deflection of the stem about the packing as a fulcrum or pivot; it being evident that the stem in a valve of this character will have sufficient inherent flexibility to permit of deflection to take care of opening movement of the valve disc.

The outer end of the stem 31 is provided with a coarse thread 45, an operating wheel 46 being carried thereon which has a hub 47 internally threaded to receive the threads upon the stem. Threadedly mounted in the cover member 37, and extending therefrom, are two stud bolts 48, each of which has a portion 49 of smaller diameter than the body of the bolt. Associated with the stud bolts are two members 50 each of which has grooves 51 therein to receive the cut-away portions 49 of the said bolts. These two members 50 are provided with bolts 52 adapted to clamp them in place with the cut-away portions 49 of the stud bolts within the grooves 51. The members 50 also have cut-away portions 53 intermediate the ends thereof which are adapted to cooperate when these members are in clamped position to fit within the cut-away portion 54 of the hub 47. The wheel 46 is also provided with a grooved rim 55 adapted to receive an operating chain or cable 56 which is preferably continuous.

As so constructed rotation of the wheel 46 causes relative movement of the wheel and the valve stem, on account of the threaded engagement between the stem and the hub of the wheel. Because of its connection to the bolts 48 the hub of the wheel is held in definitely spaced relation to the cover member 37 and so in definitely spaced relation to the valve fitting and the valve seat carried thereby. Any movement of the stem 31 relative to the hub 47 will, therefore, cause a swinging of the valve disc about its pivot bar 19 to move the valve disc toward or from its seat. Preferably the thread 45 is coarse, that is, it has a big lead, so that quick opening of the valve disc is secured upon rotation of the wheel.

The cover member 37 is attached to the upstanding flange 36 by means of a plurality of bolts 60, a packing member 61 being inserted between the cover member and the flange to prevent leakage. The cover member is also provided with a hand hole 62 normally closed by means of the plate 63, the plate being attached to the cover member by means of bolts 64, a gasket 65 being inserted between the plate and the cover member to prevent leakage.

While the form of mechanism herein shown and described constitutes a preferred form of embodiment of the invention, it is to be understood that other forms might be adopted, all coming within the scope of the claims which follow.

What I claim is:—

1. A casting for an angle valve fitting having each end adapted for machining to form a seat for a valve member; and means adjacent each end, whereby the valve member may be pivotally attached to the fitting, said means being to one side of the center of said seat.

2. A valve fitting having each end adapted for forming a valve seat; and means carried by the fitting adjacent each end adapted for carrying the valve member, so that it may be pivotally attached to the fitting adjacent the seat at either end, and to one side of the center of said seat.

3. A valve comprising a fitting having each end adapted for forming a valve seat; means for pivotally attaching a valve member within the fitting, adjacent either end, to cooperate with the seat formed in such end; and means for operating said valve member, said means being adapted for positioning to operate the valve member when mounted adjacent either end.

4. An angle valve comprising a fitting having a valve seat; a valve disc within said valve fitting, associated with the valve seat; pivot lugs upon the back of said valve disc, and to one side of a diameter thereof; a pivot member carried by the valve fitting and passing through said pivot lugs; and means for swinging said valve disc about the pivot member; the pivot member being so positioned, relative to the valve disc and the valve seat, that upon opening movement of said valve disc the face thereof moves directly away from the valve seat.

5. An angle valve comprising a fitting having a valve seat at one end, and an opening intermediate the ends thereof; a valve member within said fitting, means for mounting said valve member within the fitting and adjacent said seat; a cover for said opening, having a passage therethrough the axis of which is substantially perpendicular to the face of the valve member, when the said member is closed, an operating stem within said passage pivotally connected at its inner end to said valve member; means associated with the other end of the said fitting adapted for machining to form a valve seat and means positioned adjacent the said other end of the fitting for receiving the valve member in mounted position, the construction of the said parts being such that the cover member may be moved to receive the operating stem for the valve member, when said valve member is positioned adjacent either end of the fitting.

6. An angle valve comprising a fitting having a valve seat; a valve disc pivotally attached to said fitting, and in cooperative relation with said seat; an operating stem pivotally attached to said valve disc; the pivotal axis upon which the valve disc is mounted intersecting a line passed through the point of attachment of the stem and valve disc and at an angle to the plane of the valve seat equal to half the angular opening of the valve, every point along said pivotal axis being equidistant from the point of attachment of the stem and valve disc and from the face of the valve disc.

7. An angle valve comprising a fitting; a valve disc pivotally mounted within the fitting; an operating mechanism for the valve disc carried by the fitting; said mechanism comprising a reciprocable stem mounted within a passage in the fitting and operatively attached to said valve disc, the passage within which said stem is mounted being of greater diameter than said stem to permit its lateral movement within said passage.

8. An angle valve fitting having each end adapted for machining to form a valve seat; means adjacent each end of said fitting for receiving a valve member in mounted position; and an opening within the fitting intermediate its ends, adapted to receive mechanism constructed for attachment to said valve member to effect operation thereof, the construction being such that the operating mechanism may be positioned within said opening in such wise as to permit attachment to, and operation of, said valve member when that valve member is mounted adjacent either seat.

9. An angle valve comprising a fitting having a valve seat at each end; a valve member within said fitting, means for mounting said valve member within the fitting and adjacent either end thereof said valve member being mounted adjacent one end of the fitting, and cooperating with one of the said end seats; an opening within the fitting, intermediate its ends, adapted to receive in operative position means constructed for attachment to said valve member to cause operation thereof, the construction being such that the said operating means may be so positioned within said opening as to permit of its operative attachment to the valve member when that valve member is mounted adjacent either seat.

10. An angle valve comprising a fitting having a valve seat at one end, and an opening therein intermediate its ends; a valve member within said fitting, means for mounting said valve member within the fitting for cooperation with the said seat member; means adjacent the other end of the fitting adapted for machining to form a valve seat, means adjacent said other end of the fitting for receiving the valve member in mounted position; a cover member for the said intermediate opening, and means carried by said cover member for operating the said valve member, said cover and operating means carried thereby being constructed for variable positioning to accommodate the said operating means to effect operation of the valve member when mounted adjacent either end of the said fitting.

In testimony whereof I hereto affix my signature.

HARRY F. SMITH.